United States Patent
French, Jr. et al.

(10) Patent No.: US 11,417,362 B2
(45) Date of Patent: Aug. 16, 2022

(54) DATA STORAGE DEVICE ELIMINATING PREAMBLE FROM SERVO SECTORS

(71) Applicant: Western Digital Technologies, Inc., San Jose, CA (US)

(72) Inventors: James B. French, Jr., Whitefish, MT (US); David T. Flynn, Mantorville, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/179,753

(22) Filed: Feb. 19, 2021

(65) Prior Publication Data

US 2022/0130420 A1   Apr. 28, 2022

Related U.S. Application Data

(60) Provisional application No. 63/106,048, filed on Oct. 27, 2020.

(51) Int. Cl.
  *G11B 21/02*   (2006.01)
  *G11B 5/012*   (2006.01)

(52) U.S. Cl.
  CPC .............. *G11B 21/02* (2013.01); *G11B 5/012* (2013.01)

(58) Field of Classification Search
  None
  See application file for complete search history.

(56) References Cited

U.S. PATENT DOCUMENTS

| | | | | |
|---|---|---|---|---|
| 4,862,443 A | * | 8/1989 | Tsuji | G11B 20/1403 369/59.25 |
| 5,777,815 A | * | 7/1998 | Kasiraj | G11B 5/5582 360/75 |
| 5,901,010 A | * | 5/1999 | Glover | G11B 5/588 360/78.12 |
| 5,966,258 A | | 10/1999 | Bliss | |
| 6,882,486 B1 | | 4/2005 | Kupferman | |
| 7,042,667 B2 | * | 5/2006 | Maple | G11B 20/10 360/48 |
| 8,625,231 B1 | | 1/2014 | Dhanda et al. | |
| 8,711,504 B1 | | 4/2014 | Everett et al. | |
| 8,711,506 B1 | | 4/2014 | Giovenzana et al. | |
| 8,760,794 B1 | | 6/2014 | Coker et al. | |
| 8,861,118 B1 | | 10/2014 | Creech et al. | |
| 10,163,459 B1 | | 12/2018 | French, Jr. | |
| 10,522,177 B1 | | 12/2019 | Bellorado et al. | |
| 10,748,569 B1 | | 8/2020 | Ogawa et al. | |

* cited by examiner

*Primary Examiner* — K. Wong
(74) *Attorney, Agent, or Firm* — Patterson + Sheridan, LLP; Steven H. VerSteeg

(57) ABSTRACT

A data storage device is disclosed comprising a head actuated over a disk comprising a plurality of servo sectors defining a plurality of data tracks, wherein each servo sector comprises a track ID followed by a sync mark followed by at least one servo burst, and a first servo sector does not include a preamble. During a read operation, a servo gate is opened in order to read the track ID, the sync mark, and the servo burst of the first servo sector. During a write operation, the servo gate is opened in order to miss reading at least part of the track ID of the first servo sector so as to reduce a write gap preceding the first servo sector.

20 Claims, 5 Drawing Sheets

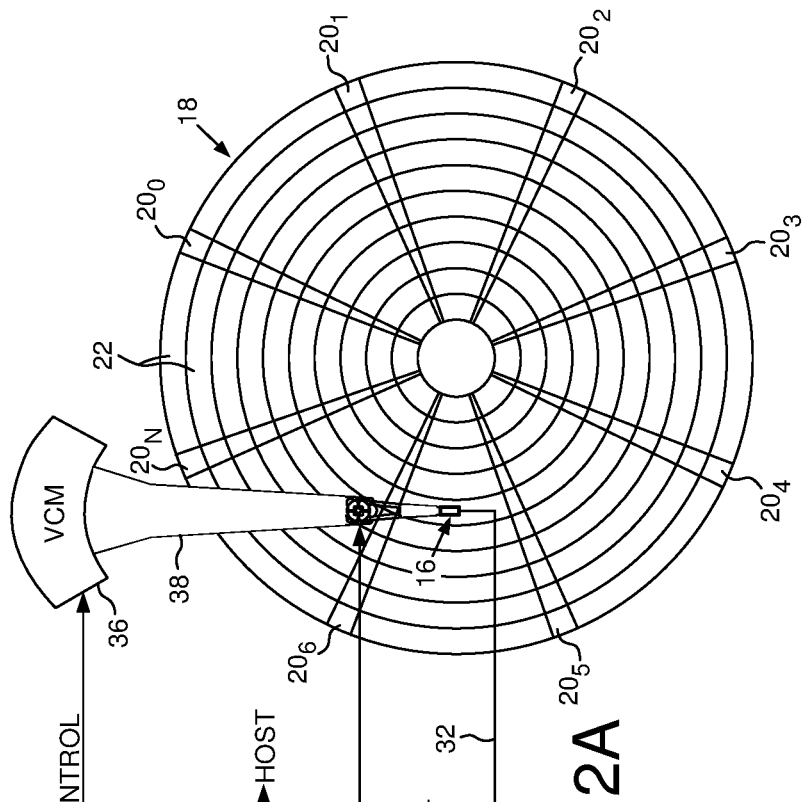
FIG. 2A
FIG. 2C
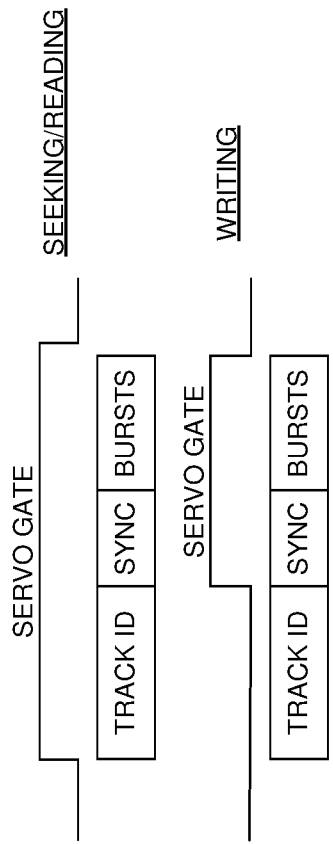
FIG. 2B

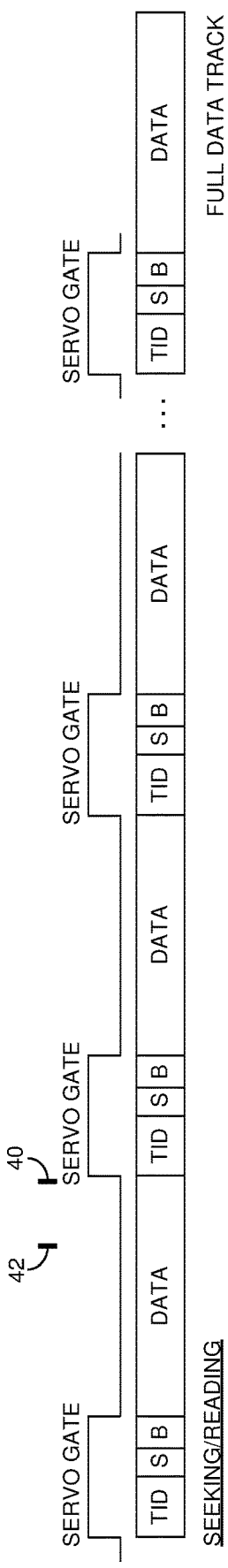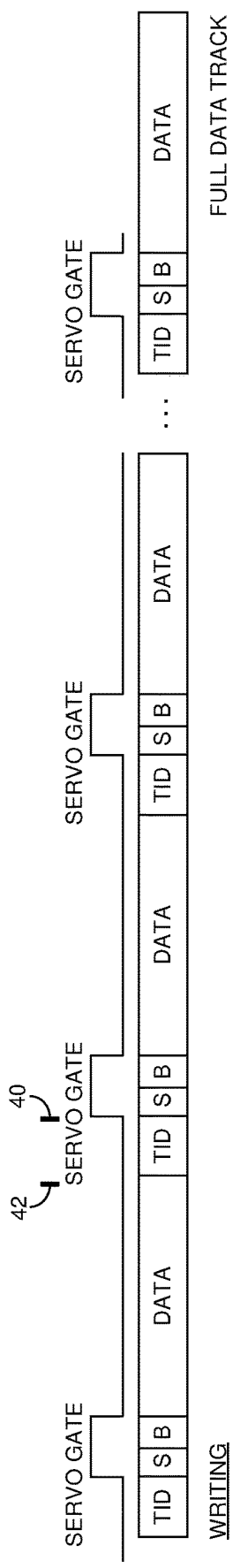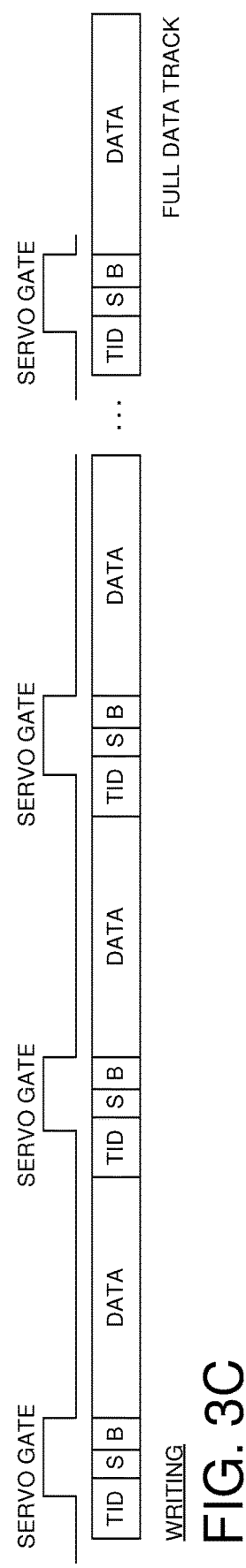

DATA STORAGE DEVICE ELIMINATING PREAMBLE FROM SERVO SECTORS

CROSS REFERENCE TO RELATED APPLICATIONS

This application claims priority to U.S. Provisional Patent Application Ser. No. 63/106,048, filed on Oct. 27, 2020, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a disk comprising a plurality of servo sectors defining a plurality of tracks.

FIG. 2B shows an embodiment wherein each servo sector comprises a track ID followed by a sync mark followed by at least one servo burst, and at least one servo sector does not include a preamble.

FIG. 2C is a flow diagram according to an embodiment wherein a servo gate is opened during a read operation in order to read the track ID, and opened during a write operation in order to reduce a write gap preceding at least one servo sector.

FIG. 3A illustrates reading a data track according to an embodiment wherein the servo gate is opened during a seek or read operation in order to read the track ID of the servo sectors.

FIG. 3B illustrates writing a data track according to an embodiment wherein the servo gate is opened in order to extend the write operation, thereby reducing a write gap preceding the servo sectors.

FIG. 3C illustrates writing a data track according to an embodiment wherein the servo gate is opened in order to read at least part of the track ID while still reducing the write gap preceding the servo sectors.

DETAILED DESCRIPTION

Figure 1:
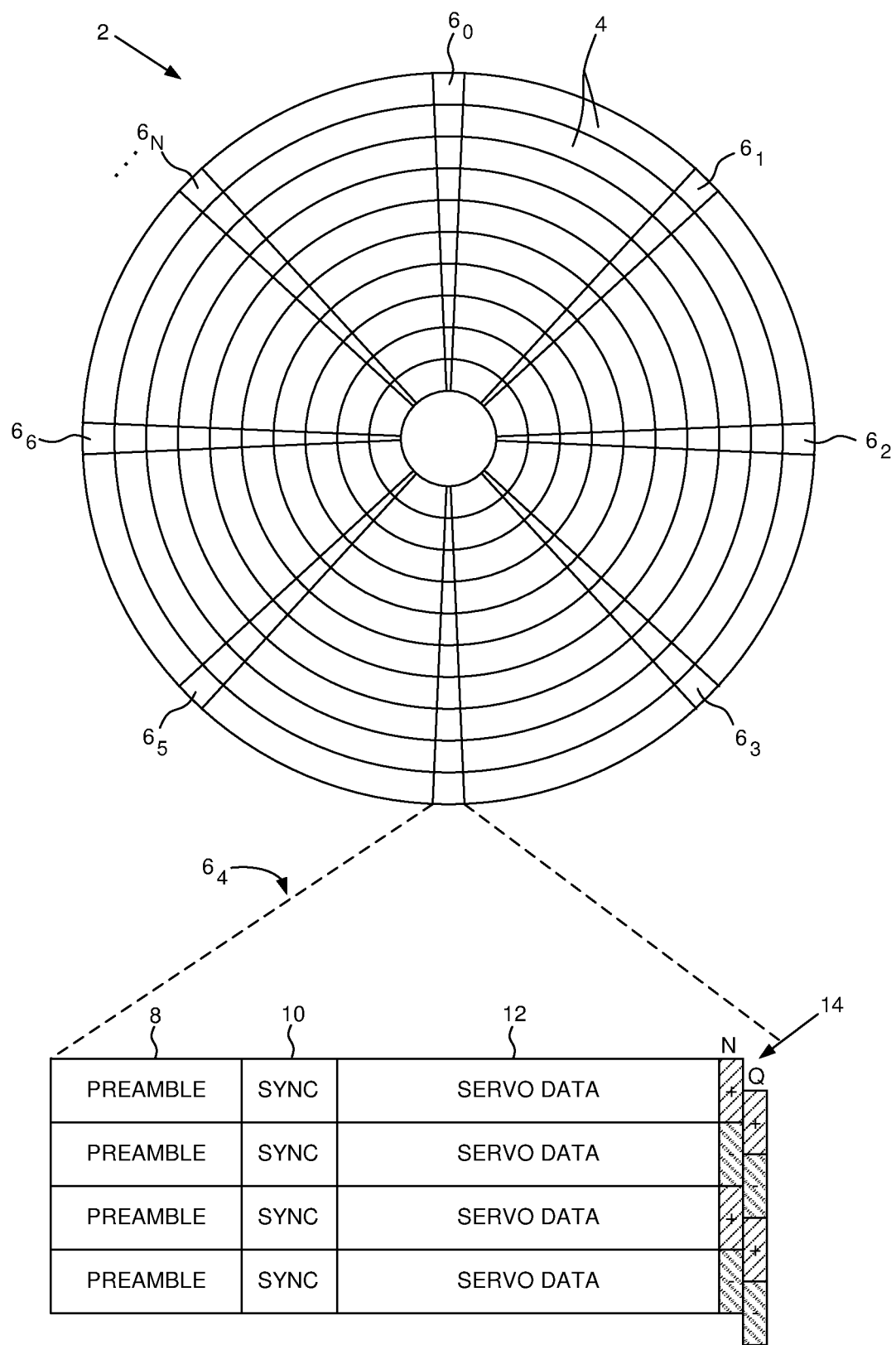
FIG. 1 shows a prior art disk format comprising a plurality of servo tracks defined by servo sectors.

FIG. 2A shows a data storage device in the form of a disk drive according to an embodiment comprising a head 16 actuated over a disk 18 comprising a plurality of servo sectors $20_0$-$20_N$ defining a plurality of data tracks 22. FIG. 2B shows an embodiment wherein each servo sector comprises a track ID followed by a sync mark followed by at least one servo burst, wherein at least one servo sector such as shown in FIG. 2B does not include a preamble. The disk drive further comprises control circuitry 24 configured to execute the flow diagram of FIG. 2C, wherein during a read operation (block 26), a servo gate is opened (block 28) in order to read the track ID, the sync mark, and the servo burst of a first servo sector as shown in FIG. 2B. During a write operation, the servo gate is opened (block 30) in order to miss reading at least part of the track ID of the first servo sector, thereby reducing a write gap preceding the first servo sector.

In the embodiment of FIG. 2A, the control circuitry 24 processes a read signal 32 emanating from the head to demodulate the servo sectors and generate a position error signal (PES) representing an error between the actual position of the head and a target position relative to a target track. A servo control system in the control circuitry 24 filters the PES using a suitable compensation filter to generate a control signal 34 applied to a VCM 36 which rotates an actuator arm 38 about a pivot in order to actuate the head radially over the disk in a direction that reduces the PES. The head may also be servoed using a fine actuator, such as a piezoelectric (PZT) actuator, configured to actuate a suspension relative to the actuator arm 38, and/or configured to actuate the head relative to the suspension. The servo sectors $20_0$-$20_N$ may comprise any suitable head position information, such as a track address for coarse positioning and servo bursts for fine positioning. In one embodiment, the servo bursts may comprise any suitable pattern wherein at least one servo burst consists of a periodic sequence of magnetic transitions, such as an amplitude based servo pattern or a phase based servo pattern (FIG. 1).

FIG. 3A shows an embodiment wherein the head 16 comprises a read element 40 separated from a write element 42 by a reader/writer gap. In this embodiment, the read element 40 leads the write element 42 meaning the read element 40 reaches a servo sector before the write element 42 as the disk spins underneath the head. When seeking the head across the disk or during read operations, the servo gate is opened as shown in FIG. 3A in order to read the entire track ID of each servo sector of a data track. However during a write operation as shown in FIG. 3B, the servo gate is opened in order to reduce a write gap that would otherwise precede each servo sector. That is, the write operation continues up until the write element 42 reaches each servo sector, thereby maximizing use of the data segments between each servo sector. In the example of FIG. 3B, when the servo gate is opened the read element 40 has missed reading the entire track ID (TID), and therefore only reads the sync mark (S) and the servo bursts (B). In this embodiment the control circuitry 24 of FIG. 2A relies on the output of a shock sensor 44 to detect an off-track condition that exceeds the range of the servo bursts. That is, aborting a write operation due to an off-track condition that would otherwise be detected by processing the TID in one embodiment is instead detected using a shock sensor 44. In one embodiment shown in FIG. 3C, the servo gate may be opened early enough to allow the read element 40 to read at least some of the least significant bits (LSBs) of the TID. In an embodiment described below with reference to FIG. 5, a write operation may be aborted based on detecting a partial TID in combination with a shock sensor 44.

In the embodiments of FIGS. 3A-3C, each servo sector is written to the disk without a preamble as compared to the prior art servo format shown in FIG. 1. In one embodiment, writing servo sectors without preambles improves the format efficiency of the disk by reserving more area for user data. The improvement in format efficiency is realized regardless as to whether the servo gate is opened late in order to reduce the write gap preceding the servo sectors (although doing so provides a further improvement in format efficiency). In one embodiment, writing servo sectors without preambles means the gain control and timing synchronization may be implemented without the benefit of reading a preamble at the beginning of each servo sector. For example, in one embodiment proper gain control of the read signal may be achieved using the embodiments disclosed in U.S. Pat. No. 6,882,486 entitled "DISK DRIVE COMPRISING ASYNCHRONOUS/SYNCHRONOUS GAIN CONTROL FOR FAULT TOLERANT DETECTION OF SERVO SYNC MARK AFTER HEAD SWITCH," the disclosure of which is incorporated herein by reference.

Figure 4A:
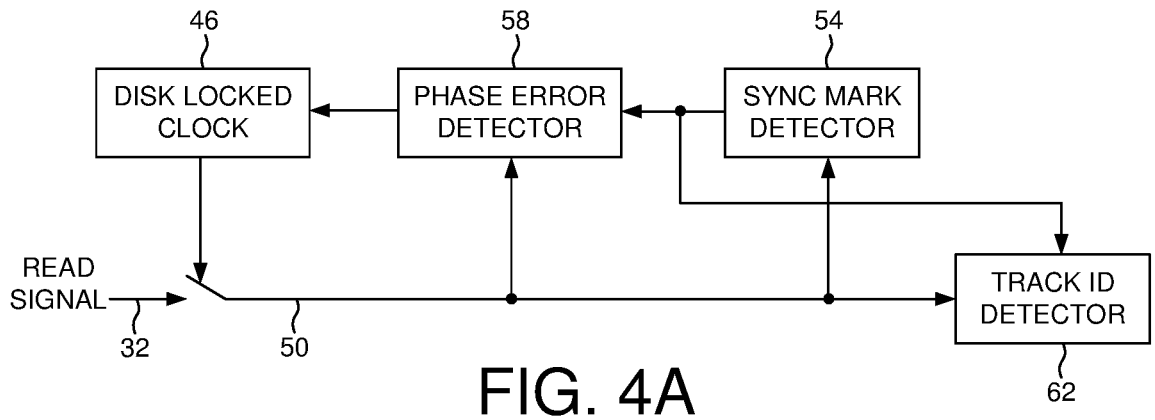
FIG. 4A shows control circuitry according to an embodiment wherein a disk locked clock samples a read signal when reading the servo sectors.
Figure 4B:
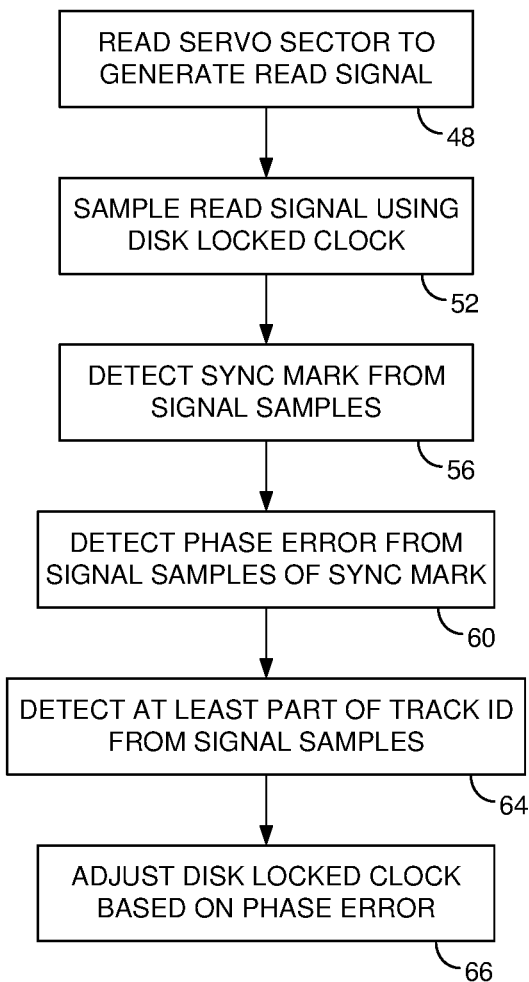
FIG. 4B is a flow diagram according to an embodiment wherein the disk lock clock is adjusted based on a phase error generated after detecting the sync mark in a servo sector.

FIG. 4A shows control circuitry according to an embodiment configured to synchronize a disk locked clock 46 without reading a preamble of a servo sector (i.e., when a servo sector is written without a preamble such as shown in FIG. 2B). Operation of the control circuitry shown in FIG. 4A may be understood with reference to the flow diagram of FIG. 4B, wherein a servo sector is read (block 48) to generate a read signal 32 which is sampled using the disk locked clock 46 to generate signal samples 50 (block 52). The sync mark of the servo sector is detected by a sync mark detector 54 processing the signal samples 50 (block 56). A phase error detector 58 detects a phase error from the signal samples 50 of the sync mark, and a data detector 62 detects at least part of a track ID from the signal samples 50 of the track ID (block 64), wherein the disk locked clock 46 is adjusted based on the detected phase error (block 66). In one embodiment, the signal samples 50 of the track ID are buffered in memory, and after detecting the sync mark the data detector 62 detects the track ID (or partial track ID) by interpolating the buffered signal samples using interpolated timing recovery (i.e., in one embodiment the track ID is detected retroactively after detecting the sync mark).

Figure 5:
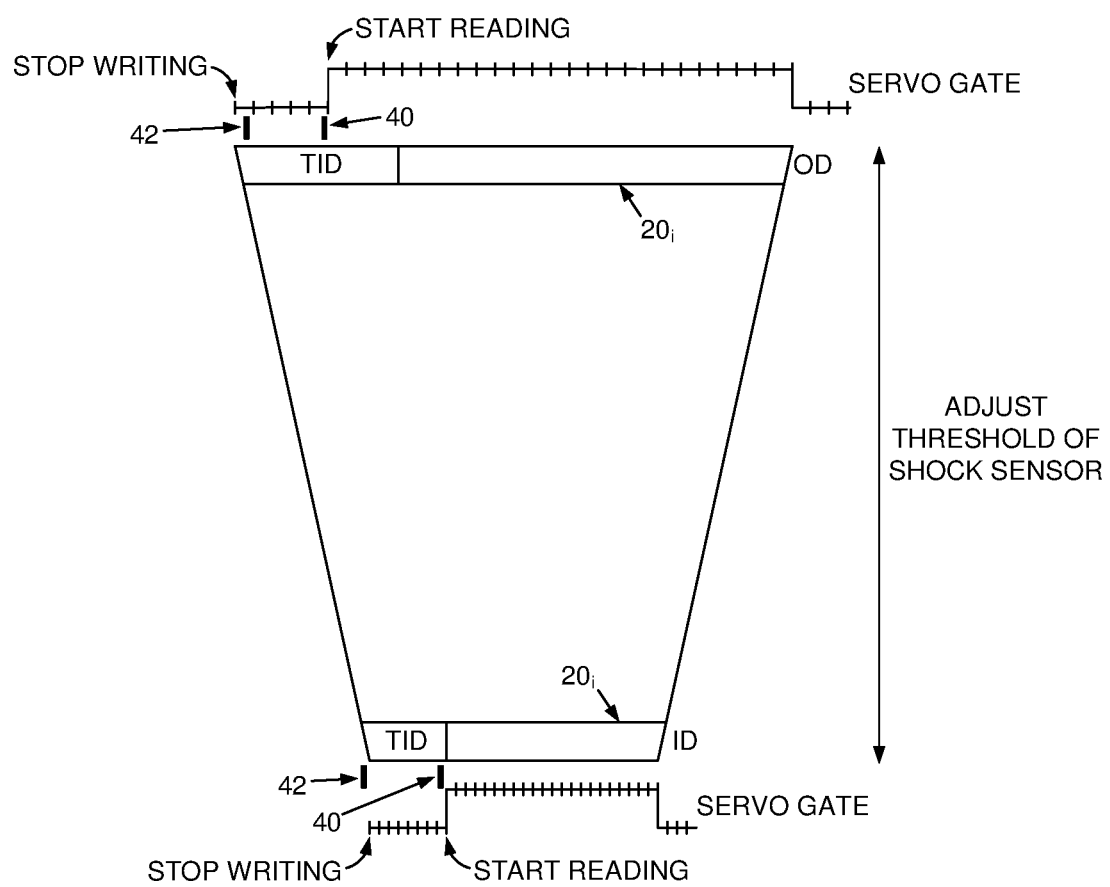
FIG. 5 shows an embodiment wherein an abort threshold of a shock sensor is adjusted based on the radial location of the head and a corresponding number of track ID bits read after opening the servo gate.

FIG. 5 shows an embodiment wherein the servo sectors $20_0$-$20_N$ are written across at least part of the disk at a constant data rate resulting in a wedge of servo sectors due to the increase in the servo track circumference toward the outer diameter (OD) of the disk. As the circumference of servo tracks increases, the reader/write gap between the read element 40 and the write element 42 relative to the width of a servo sector decreases as shown in FIG. 5. Accordingly in this embodiment, the servo gate may be opened at a different cycle of the disk locked clock depending on the radial location of the head (where the hatch marks overlayed on the servo gate represent the cycles of the disk locked clock). The write operation stops on the cycle of the disk locked clock that corresponds to the write element 42 reaching the beginning of the servo sector as shown in FIG. 5, thereby reducing the write gap preceding the servo sectors. Once the write operation stops, the servo gate may be opened on the next cycle of the disk locked clock which varies depending on the radial location of the head. That is, the servo gate may be opened earlier toward the OD of the disk as shown in FIG. 5 such that during a write operation at least part of the track ID may be read by the read element 40 when reading a servo sector. When part of the track ID can be read (i.e., when LSBs of the track ID can be read), in one embodiment the partial track ID can be processed to detect an off-track write condition so that the write operation may be aborted. In one embodiment as the number of LSBs of the track ID read increases, the more reliable the track ID becomes in detecting an off-track write condition. Accordingly in one embodiment, the abort threshold of the shock sensor 44 in FIG. 2A may be adjusted based on the length of the track ID read (i.e., the number of LSBs read). For example, as the number of the track ID bits read increases, the abort threshold of the shock sensor 44 can be decreased since the partial track ID becomes more reliable in detecting an off-track condition.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of servo sectors defining a plurality of data tracks, wherein:
      each servo sector comprises a track ID followed by a sync mark followed by at least one servo burst; and
      a first servo sector does not include a preamble for timing synchronization of a read signal;
   a head actuated over the disk; and
   control circuitry configured to:
      during a read operation, open a servo gate in order to read the track ID, the sync mark, and the servo burst of the first servo sector; and
      during a write operation, open the servo gate in order to miss reading at least part of the track ID of the first servo sector so as to reduce a write gap preceding the first servo sector.

2. The data storage device as recited in claim 1, wherein at least one servo burst of the first servo sector consists of a periodic sequence of magnetic transitions.

3. The data storage device as recited in claim 2, wherein the at least one servo burst of the first servo sector consists of an amplitude based servo burst.

4. The data storage device as recited in claim 2, wherein the at least one servo burst of the first servo sector consists of a phase based servo burst.

5. The data storage device as recited in claim 1, wherein the control circuitry is further configured to:
   read the first servo sector to generate a read signal;
   sample the read signal using a disk locked clock to generate signal samples;
   detect the sync mark from the signal samples and detect a phase error from the signal samples of the sync mark; and
   after detecting the sync mark, detect at least part of the track ID from the signal samples and adjust the disk locked clock based on the detected phase error.

6. The data storage device as recited in claim 1, further comprising a shock sensor configured to generate a shock signal representing a shock affecting the data storage device, wherein the control circuitry is further configured to abort the write operation when the shock signal exceeds an abort threshold.

7. The data storage device as recited in claim 6, wherein the control circuitry is further configured to adjust the abort threshold based on a length of the track ID that is read when opening the servo gate during the write operation.

8. The data storage device of claim 1, wherein each servo sector comprises the track ID immediately followed by the sync mark immediately followed by at least one servo burst.

9. A data storage device comprising:
   a disk comprising a plurality of servo sectors defining a plurality of data tracks, wherein:
      each servo sector comprises a track ID followed by a sync mark followed by at least one servo burst; and
      a first servo sector does not include a preamble for timing synchronization of a read signal;
   a head actuated over the disk; and
   control circuitry configured to:
      read the first servo sector to generate a read signal;
      sample the read signal using a disk locked clock to generate signal samples;
      detect the sync mark from the signal samples and detect a phase error from the signal samples; and
      after detecting the sync mark, detect at least part of the track ID from the signal samples and adjust the disk locked clock based on the detected phase error.

10. The data storage device as recited in claim 9, wherein at least one servo burst of the first servo sector consists of a periodic sequence of magnetic transitions.

11. The data storage device as recited in claim 10, wherein the at least one servo burst of the first servo sector consists of an amplitude based servo burst.

12. The data storage device as recited in claim 10, wherein the at least one servo burst of the first servo sector consists of a phase based servo burst.

13. The data storage device as recited in claim 9, wherein the control circuitry is further configured to:
   during a read operation, open a servo gate in order to read the track ID, the sync mark, and the servo burst of the first servo sector; and
   during a write operation, open the servo gate in order to miss reading at least part of the track ID of the first servo sector so as to reduce a write gap preceding the first servo sector.

14. The data storage device as recited in claim 13, further comprising a shock sensor configured to generate a shock signal representing a shock affecting the data storage device, wherein the control circuitry is further configured to abort the write operation when the shock signal exceeds an abort threshold.

15. The data storage device as recited in claim 14, wherein the control circuitry is further configured to adjust the abort threshold based on a length of the track ID that is read when opening the servo gate during the write operation.

16. A data storage device comprising:
   a disk comprising a plurality of servo sectors defining a plurality of data tracks, wherein:

each servo sector comprises a track ID followed by a sync mark followed by at least one servo burst; and
a first servo sector does not include a preamble for timing synchronization of a read signal;
a head actuated over the disk; and
a means during a read operation for opening a servo gate in order to read the track ID, the sync mark, and the servo burst of the first servo sector; and
a means during a write operation for opening the servo gate in order to miss reading at least part of the track ID of the first servo sector so as to reduce a write gap preceding the first servo sector.

17. The data storage device as recited in claim 16, wherein at least one servo burst of the first servo sector consists of a periodic sequence of magnetic transitions.

18. The data storage device as recited in claim 17, wherein the at least one servo burst of the first servo sector consists of an amplitude based servo burst.

19. The data storage device as recited in claim 17, wherein the at least one servo burst of the first servo sector consists of a phase based servo burst.

20. The data storage device as recited in claim 16, further comprising:
a means for reading the first servo sector to generate a read signal;
a means for sampling the read signal using a disk locked clock to generate signal samples;
a means for detecting the sync mark from the signal samples and detecting a phase error from the signal samples of the sync mark; and
after detecting the sync mark, a means for detecting at least part of the track ID from the signal samples and for adjusting the disk locked clock based on the detected phase error.

* * * * *